United States Patent [19]
Tatani et al.

[11] Patent Number: 5,980,846
[45] Date of Patent: Nov. 9, 1999

[54] GAS REFINING SYSTEM

[75] Inventors: Atsushi Tatani; Kazuaki Kimura; Makoto Susaki, all of Tokyo; Toshikuni Sera; Kenji Inoue, both of Hiroshima-ken, all of Japan

[73] Assignee: Mitsubishi Jukogyo Kabushiki Kaisha, Tokyo, Japan

[21] Appl. No.: 09/074,033

[22] Filed: May 6, 1998

Related U.S. Application Data

[63] Continuation of application No. 08/667,139, Jun. 20, 1996, abandoned.

[30] Foreign Application Priority Data

Oct. 11, 1995 [JP] Japan ................................ 7-263105

[51] Int. Cl.$^6$ .............................. B01D 53/48; B01D 53/34
[52] U.S. Cl. .............. 423/230; 423/243.03; 423/244.02; 423/570; 48/198.7
[58] Field of Search ............................ 423/230, 243.03, 423/244.02, 570; 48/198.7

[56] References Cited

U.S. PATENT DOCUMENTS

| | | | |
|---|---|---|---|
| 4,478,800 | 10/1984 | Van Der Wal | 423/244.02 |
| 4,533,531 | 8/1985 | Shinoda et al. | 423/243.03 |
| 5,154,900 | 10/1992 | Nakayama et al. | 423/230 |

FOREIGN PATENT DOCUMENTS

| | | |
|---|---|---|
| 1444956 | 11/1968 | Germany . |
| 63-12801 | 5/1988 | Japan . |
| 01254226 | 10/1989 | Japan . |
| 2-237613 | 9/1990 | Japan . |

*Primary Examiner*—Tae Yoon
*Attorney, Agent, or Firm*—Alston & Bird LLP

[57] ABSTRACT

This invention relates to a gas refining system wherein a high-temperature and high-pressure reducing gas is introduced into a fixed-bed desulfurizer packed with an adsorbent by which sulfur compounds contained in the high-temperature and high-pressure reducing gas are adsorbed and removed in the form of a sulfide, and the adsorbent having the sulfide adsorbed thereon is regenerated by roasting it with a regenerating gas containing oxygen, characterized in that the gas refining system is equipped with oxygen concentration control means for controlling the oxygen concentration in the regenerating gas introduced into the desulfurizer so as to keep the internal temperature of the desulfurizer during the regeneration reaction within the allowable temperature range of the adsorbent. This invention includes an embodiment in which the exhaust gas obtained after the regeneration reaction gas is brought into contact with a calcium compound-containing slurry to recover gypsum is recycled to the desulfurizer for use as the regenerating gas for the adsorbent. Thus, the adverse effect of the heat of regeneration reaction on the adsorbent used in the fixed-bed desulfurizer can be avoided positively and easily.

4 Claims, 3 Drawing Sheets

GAS REFINING SYSTEM

This application is a continuation of U.S. patent application Ser. No. 08/667,139, filed on Jun. 20, 1996 now abandoned.

BACKGROUND OF THE INVENTION

1. Field of the Invention

This invention relates to a gas refining system for removing hydrogen sulfide contained in high-temperature and high-pressure reducing gases such as gas produced in a coal gasification process. More particularly, it relates to a gas refining system wherein the adverse effect of the heat of regeneration reaction on the adsorbent used in the fixed-bed desulfurizers can be avoided positively and easily.

2. Description of the Related Art

In recent years, the diversification of fuels (or raw materials) is advocated because of the exhaustion and rising cost of petroleum resources, and the development of techniques for utilizing coal and heavy oils (e.g., tar sand oil, shale oil, Taching heavy oil, Maya crude oil or vacuum distillation residue) has been promoted. As an example, attention has been paid to techniques for gasifying coal and heavy oils to produce fuels for use in electric power generation or the like and raw materials for use in syntheses. However, such gases obtained by the gasification of coal and heavy oils contain several hundred to several thousand parts per million of hydrogen sulfide, which must be removed for the purpose of preventing environmental pollution or protecting downstream equipment (e.g., gas turbines) against corrosion. Among the processes for removing hydrogen sulfide is a dry gas refining process which is advantageous from the viewpoint of thermal economy and simple in construction. This gas refining process is such that an oxide of a metal (e.g., Fe) is used as an adsorbent, sulfur compounds contained in a gas are adsorbed and removed by the adsorbent within a desulfurizer in the form of a sulfide, and the adsorbent having reduced adsorption capacity is regenerated by roasting it with an oxygen-containing gas. As the desulfurizer packed with the adsorbent, there is used not only a desulfurizer of the so-called fluidized-bed or moving-bed type, but also a desulfurizer of the fixed-bed type which has various advantages such as quick responsiveness to load variations, great adaptability to varying type of coal, and the simple construction and small size of the apparatus.

As to the way of dealing with the gas containing sulfur dioxide ($SO_2$) formed during regeneration, there is a process in which the sulfur dioxide is reduced by a gaseous reduction technique and recovered (or discharged from the system) in the form of elemental sulfur, as described, for example, in Japanese Patent Provisional Publication No. 2-237613. In this case, air (or an oxygen-containing gas) is supplied at only one site for the purpose of regeneration.

Moreover, as described, for example, in Japanese Patent Provisional Publication Nos. 63-123801 and 1-254226, there is a process in which the regeneration gas containing sulfur dioxide formed by the roasting reaction is introduced into a reactor where, it is brought into contact with a calcium compound-containing slurry to effect the absorption and oxidation of sulfur dioxide and the precipitation of gypsum within the reactor. Thus, gypsum is recovered (or discharged from the system) as a by-product. In this case, air (or an oxygen-containing gas) needs to be supplied at two sites for the purposes of regeneration and oxidation within the aforesaid reactor.

However, the above-described conventional gas refining techniques involve the following problems.

(1) First of all, as can be seen from the above-mentioned patent publications, no particular control over the temperature of the adsorbent is exercised. Consequently, when a fixed-bed desulfurizer is used, there is a possibility that the temperature of the adsorbent may exceed its allowable limit to produce undesirable effects such as deterioration or powdering thereof, resulting in a marked reduction in desulfurization performance. More specifically, in the case of an adsorbent comprising, for example, iron oxide ($Fe_2O_3$), its temperature limit is in the range of 650 to 700° C. even though it has been subject to a treatment for imparting thermal resistance thereto. If this temperature limit is exceeded, the adsorbent may be deteriorated to cause a sharp degradation in properties associated with adsorption performance (e.g., specific surface area, pore volume and particle diameter), or may be powdered. Then, not only the desulfurization performance is reduced, but also dust is newly produced in the desulfurizer to seriously interfere with the decontamination of gases obtained by the gasification of coal and the like. In the case of a fixed-bed desulfurizer, undesirable effects such as deterioration or powdering of the adsorbent during operation need to be avoided with high reliability because it is difficult to exchange the adsorbent.

(2) Moreover, especially in gas refining processes wherein gypsum is recovered from the regeneration gas, it is difficult to control the supply of air because air (or oxygen) is supplied at two sites. Accordingly, careful consideration must be given from the viewpoint of protection of the adsorbent. That is, there is a possibility that, since the temperature of the adsorbent during its regeneration varies according to the feed rate of air, an excessive supply of air may cause the temperature of the adsorbent to exceed the aforesaid allowable temperature range.

SUMMARY OF THE INVENTION

In view of the above-described prior art, an object of the present invention is to provide a gas refining system which permits the temperature of the adsorbent used in the fixed-bed desulfurizers can be controlled positively and easily.

The gas refining system of the present invention has the following four aspects.

(1) A gas refining system wherein a high-temperature and high-pressure reducing gas is introduced into a fixed-bed desulfurizer packed with an adsorbent by which sulfur compound (or compounds) contained in the high-temperature and high-pressure reducing gas is adsorbed and removed in the form of a sulfide; the adsorbent having the sulfide adsorbed thereon is regenerated by roasting it with a regenerating gas containing oxygen; and oxygen concentration control means is provided for controlling the oxygen concentration in the regenerating gas introduced into the desulfurizer so as to keep the internal temperature of the desulfurizer during the regeneration reaction within the allowable temperature range of the adsorbent.

(2) A gas refining system wherein a high-temperature and high-pressure reducing gas is introduced into a fixed-bed desulfurizer packed with an adsorbent by which sulfur compound (or compounds) contained in the high-temperature and high-pressure reducing gas is adsorbed and removed in the form of a sulfide; the adsorbent having the sulfide adsorbed thereon is regenerated by roasting it with a regenerating gas containing oxygen; the regeneration reaction gas containing sulfur dioxide formed by the regeneration reaction is introduced into a reactor where the regeneration reaction gas and an oxygen-containing gas are blown into a calcium compound-containing slurry fed to the reactor, and thereby brought into gas-liquid contact with the slurry to effect the absorption of sulfur dioxide and the precipitation of gypsum within the reactor; the gas produced above the surface of the slurry within the reactor is withdrawn from the reactor as regeneration recycle gas; the regeneration recycle gas is replenished with an oxygen-containing gas and recycled for use as the regenerating gas for the adsorbent; and oxygen concentration control means is provided comprising reactor-side oxygen feed rate control means for controlling the flow rate of the oxygen-containing gas blown into the slurry within the reactor so as to give an amount of oxygen greater than that required for complete oxidation of the absorbed sulfurous acid, and desulfurizer-side oxygen feed rate control means for controlling the flow rate of the oxygen-containing gas added to the regeneration recycle gas so as to maintain the oxygen concentration in the regenerating gas on a level which keeps the internal temperature of the desulfurizer during the regeneration reaction within the allowable temperature range of the adsorbent.

(3) A gas refining system wherein a high-temperature and high-pressure reducing gas is introduced into a fixed-bed desulfurizer packed with an adsorbent by which sulfur compounds contained in the high-temperature and high-pressure reducing gas are adsorbed and removed in the form of a sulfide; the adsorbent having the sulfide adsorbed thereon is regenerated by roasting it with a regenerating gas containing oxygen; the regeneration reaction gas containing sulfur dioxide formed by the regeneration reaction is introduced into a reactor where the regeneration reaction gas and an oxygen-containing gas are blown into a calcium compound-containing slurry fed to the reactor, and thereby brought into gas-liquid contact with the slurry to effect the absorption of sulfur dioxide and the precipitation of gypsum within the reactor; the gas produced above the surface of the slurry within the reactor is withdrawn from the reactor as regeneration recycle gas; the regeneration recycle gas is recycled for use as the regenerating gas for the adsorbent; and oxygen concentration control means is provided comprising reactor-side oxygen feed rate control means for controlling the flow rate of the oxygen-containing gas blown into the slurry within the reactor so as to maintain the oxygen concentration in the regenerating gas on a level which keeps the internal temperature of the desulfurizer during the regeneration reaction within the allowable temperature range of the adsorbent.

(4) A gas refining system as described above in paragraph (2) or (3) wherein the gas refining system is equipped with temperature control means for controlling the temperature of the slurry within the reactor so as to fall within a temperature range which causes gypsum dihydrate to precipitate.

The high-temperature and high-pressure reducing gases which can be treated by the gas refining system of the present invention are high-temperature and high-pressure gases (typically having a temperature of about 250 to 500° C. and a pressure of about 25 to 30 kg/cm ) which are obtained by the gasification of coal and heavy oils (e.g., tar sand oil, shale oil, Taching heavy oil, Maya crude oil or vacuum distillation residue) and contain sulfur compound (or compounds) such as hydrogen sulfide and/or carbonyl sulfide.

In the gas refining system of the present invention, the oxygen concentration in the regenerating gas introduced into the desulfurizer is controlled by oxygen concentration control means so that the temperature of the adsorbent within the desulfurizer in course of the regeneration reaction will be kept within its allowable temperature range.

Since the temperature of the adsorbent within the desulfurizer in course of the regeneration reaction depends largely on the feed rate of oxygen, the construction of the present invention in which temperature control of the adsorbent is effected by controlling the oxygen concentration makes it possible to control the temperature of the adsorbent with good responsiveness and hence prevent deterioration or powdering of the adsorbent positively and easily.

Moreover, the temperature of the adsorbent can be maintained at the highest possible level in the vicinity of its allowable limit by presetting the oxygen concentration target value close to its limit. This is effective in accelerating the regeneration (or roasting) reaction while preventing deterioration or the like of the adsorbent, and thereby completing the regeneration step in the shortest period of time.

That is, in the conventional system wherein no particular control over the oxygen concentration is exercised for the purpose of controlling the temperature of the adsorbent, the feed rate of oxygen must be preset at a relatively lower value with consideration for transient changes in temperature and oxygen concentration, in order to prevent deterioration or the like of the adsorbent positively. As a result, the regeneration step extends over a long period of time. This problem can be solved by the present invention.

Furthermore, in the systems described above in paragraphs (2) to (4), the gas produced above the surface of the slurry within the reactor is withdrawn from the reactor as regeneration recycle gas and recycled for use as the regenerating gas in the regeneration (or roasting) reaction of the adsorbent in the desulfurizer. This is effective in reducing the amount of air (or nitrogen) used as an inert gas.

Furthermore, the partial pressure of oxygen within the reactor is maintained at a value greater than the minimum partial pressure of oxygen required to completely oxidize the sulfurous acid absorbed into the slurry. As a result, the oxidation reactions occurring in the reactor are sufficiently accelerated to achieve the efficient precipitation of gypsum and maintain high absorption performance for sulfur dioxide.

In the system described above in paragraph (3), the construction of the oxygen concentration control means is much simplified and an oxygen-containing gas can be supplied to the entire system through only one oxygen-containing gas supply line. This is effective in simplifying the piping design and equipment construction of the system and, in turn, achieving a reduction in the size and cost of the system.

In the system described above in paragraph (4), gypsum which can be sold on the market is obtained as a by-product. Moreover, the resulting gypsum is in the form of gypsum dihydrate that has great utility and is easy to handle. Specifically, gypsum dihydrate has sufficient characteristics for use, for example, as a raw material for the manufacture of building materials having a large-scale market, and can be stored outdoors and handled easily as contrasted with α-gypsum hemihydrate. Thus, it is useful for practical purposes and advantageous from the viewpoint of profit recovery by the selling of gypsum.

DETAILED DESCRIPTION OF PREFERRED EMBODIMENTS

Figure 1:
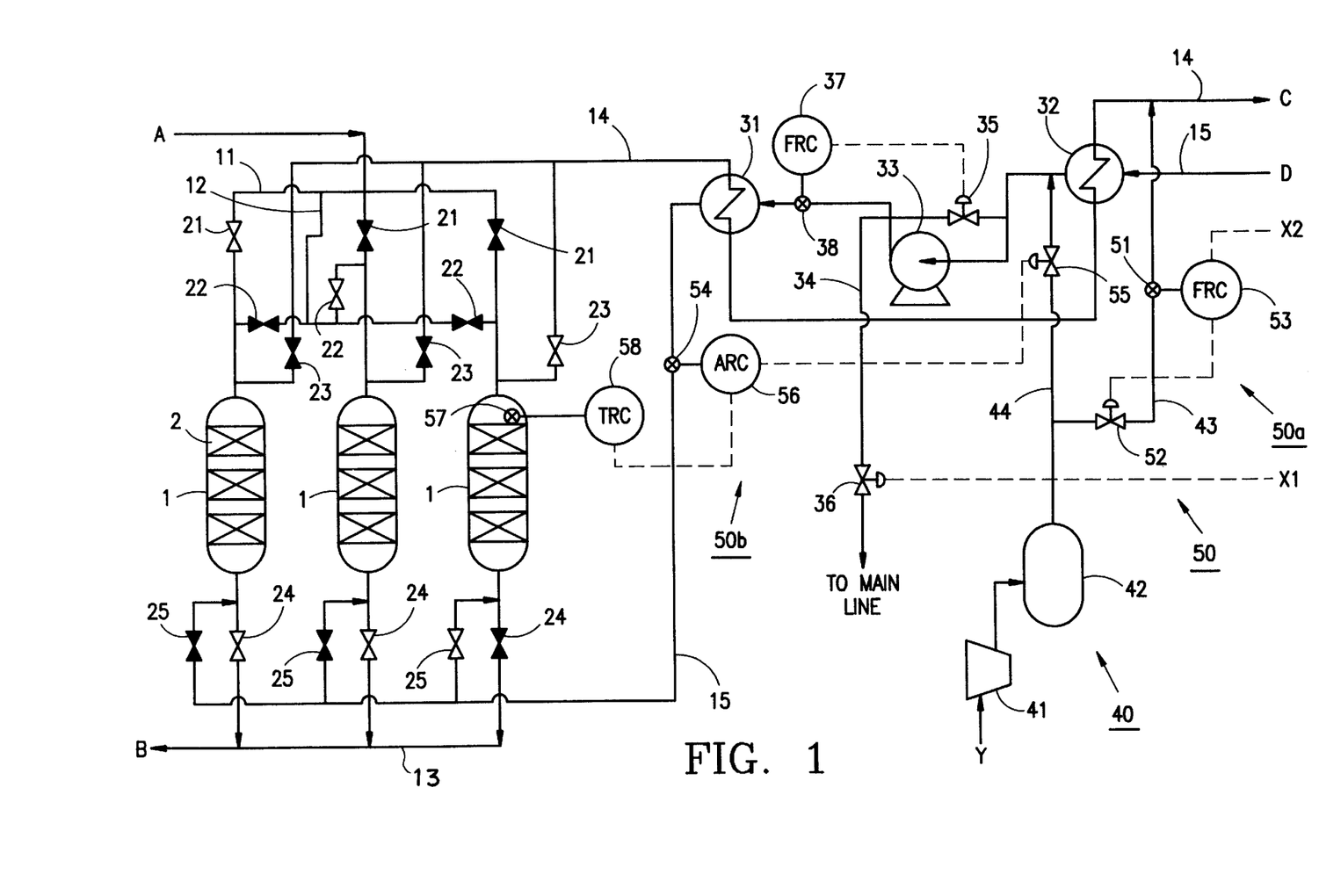
FIG. 1 is a flow diagram showing chiefly the construction of the gas refining section of a gas refining system in accordance with one embodiment of the present invention.
Figure 2:
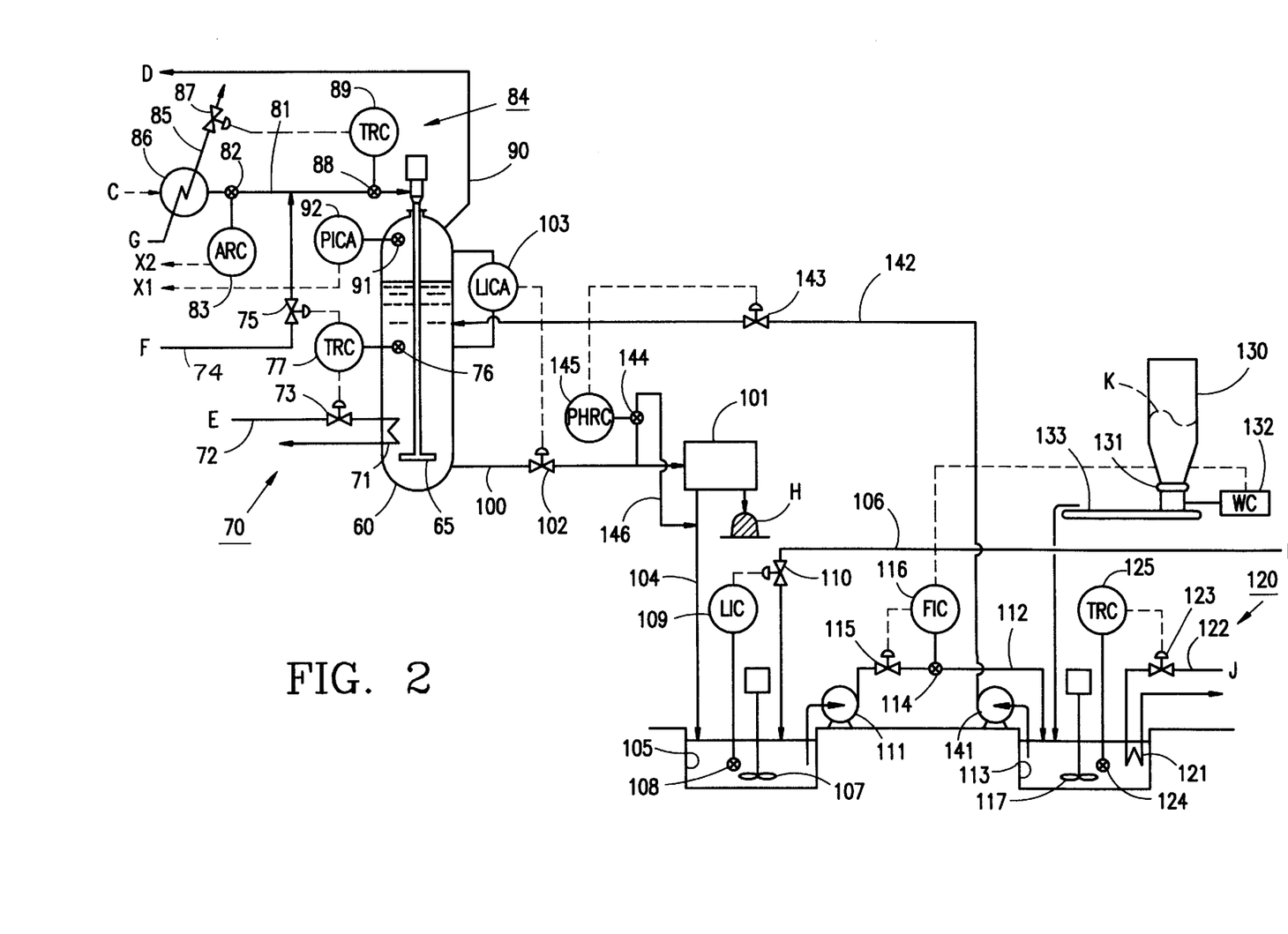
FIG. 2 is a flow diagram showing chiefly the construction of the gypsum recovery section of the same gas refining system.

One embodiment of the present invention will be described hereinbelow with reference to the accompanying drawings. FIG. 1 is a flow diagram showing chiefly the construction of the gas refining section of a gas refining system in accordance with this embodiment, and FIG. 2 is a flow diagram showing chiefly the construction of the gypsum recovery section of the same gas refining system.

First of all, the construction of the gas refining section is explained. Although the gas refining section of the gas refining system in accordance with this embodiment may include three or more fixed-bed desulfurizers, three desulfurizers 1 are shown in FIG. 1. Each of these desulfurizers 1 is packed with a honeycomb adsorbent 2 comprising an oxide of a metal such as Fe, Zn, Mo, Mn, Cu or W, and used to carry out absorption, regeneration and reduction steps in sequence as will be described later. In the state shown in FIG. 1, the left-hand desulfurizer 1 is operating in the mode of the absorption step, the middle desulfurizer 1 is operating in the mode of the reduction step, and the right-hand desulfurizer 1 is operating in the mode of the regeneration step.

As adsorbent 2, there may be used an adsorbent comprising, for example, $Fe_2O_3$. More specifically, this adsorbent is prepared, for example, by mixing a solution of iron nitrate (which will be converted to $Fe_2O_3$ by firing) with $TiO_2$ powder, forming this mixture into a honeycomb structure, drying it and then firing it. Preferably, $SiO_2$ may previously be added to $Fe_2O_3$ constituting the adsorbent component in order to impart thermal stability thereto, and $TiO_2$ used as the substrate may previously be fired at about 800° C. in order to impart thermal resistance thereto.

If the adsorbent 2 prepared in the above-described manner is exposed to high temperatures exceeding a certain temperature limit, the adsorbent component ($Fe_2O_3$) and the substrate ($TiO_2$) may be deteriorated. As a result, their properties affecting adsorption performance, such as specific surface area, pore volume and particle diameter, may be degraded rapidly. Its service temperature limit is determined to be a peak value of 800° C. or below or a rated value of 650 to 700° C. Unless an adsorbent comprising $Fe_2O_3$ is subjected to the above-described treatments for imparting thermal resistance thereto, its rated temperature limit will be lowered to about 600° C.

This gas refining section is equipped with several gas pipe lines including a first gas inlet line 11 for introducing a high-temperature and high-pressure reducing gas A (hereinafter referred to as "reducing gas A") to be refined (or freed of sulfur compounds) in order to carry out the absorption step which will be described later, a second gas inlet line 12 for introducing reducing gas A in order to carry out the reduction step which will be described later, a refined gas outlet line 13 for discharging the refined high-temperature and high-pressure reducing gas B (hereinafter referred to as "refined gas B"), a regeneration reaction gas outlet line 14 for conducting the gas C discharged from desulfurizer 1 operating in the mode of the regeneration step which will be described later (hereinafter referred to as "regeneration reaction gas C"), and a regeneration recycle gas inlet line 15 for introducing a regenerating gas D to be supplied to desulfurizer 1 operating in the mode of the regeneration step which will be described later (hereinafter referred to as "regeneration recycle gas D").

In the illustrated embodiment, the gas discharged from desulfurizer 1 operating in the mode of the reduction step (hereinafter referred to as "the reduction gas") is introduced directly into refined gas outlet line 13. However, there may be provided a reduction gas return line for introducing this reduction gas into desulfurizer 1 operating in the mode of the absorption step. Since the amount of the reduction gas is very small and equal to about 1% of the amount of refined gas B, its direct addition to refined gas B does not pose a problem such as variation in calorific value due to a loss of combustible gases ($H_2$ and CO).

Moreover, valves 21, 22 and 23 are installed so as to controllably connect the inlet port for reducing gas A of each desulfurizer 1 with the aforesaid first gas inlet line 11, second gas inlet line 12 and regeneration reaction gas outlet line 14, respectively. Similarly, valves 24 and 25 are installed so as to controllably connect the outlet port for reducing gas A of each desulfurizer 1 with refined gas outlet line 13 and regeneration recycle gas inlet line 15, respectively.

These valves are designed so that their operation is controlled by a controller (not shown) and they are opened or closed according to the type of the step carried out in each desulfurizer. In FIG. 1, the valves represented by solid symbols are in a fully closed state and those represented by open symbols are in a fully or partially opened state.

Regeneration recycle gas inlet line 15 is provided with two heat exchangers 31 and 32 which are designed so as to heat regeneration recycle gas D by regeneration reaction gas C while protecting a blower 33 for blowing regeneration recycle gas D under pressure (e.g., a regeneration recycle gas blower). Thus, the temperature of regeneration recycle gas D is raised to a value suitable for the regeneration reaction.

On the suction side of blower 33, a regeneration recycle gas discharge line 34 is connected with regeneration recycle gas inlet line 15 so that any excess of regeneration recycle gas D is discharged to the main line (e.g., refined gas outlet line 13).

This regeneration recycle gas discharge line 34 is provided with flow control valves 35 and 36 in that order toward the downstream side. The opening of flow control valve 35 is regulated by a flow controller 37 and the opening of flow control valve 36 is regulated in response to a control signal X1 from a pressure controller 92 (shown in FIG. 2) which will be described later. Flow controller 37 regulates the opening of flow control valve 35 so as to adjust the flow rate of regeneration recycle gas D supplied to desulfurizer 1 to a predetermined constant value, on the basis of the output of a flow sensor 38 installed in regeneration recycle gas inlet line 15 on the delivery side of blower 33. Pressure controller 92 produces a control signal X1 for regulating the opening of flow control valve 36 so as to keep the internal pressure of a reactor 60 shown in FIG. 2 within a predetermined range, on the basis of the output of a pressure sensor 91 (shown in FIG. 2) which will be described later.

Regeneration reaction gas outlet line 14 and regeneration recycle gas inlet line 15 are provided with oxygen supply means 40 for supplying an oxygen-containing gas Y (i.e., air in this case) to these lines. Oxygen supply means 40 comprises a compressor 41 which constitutes a source of air, an air holder 42 which is a tank for storing compressed air delivered from this compressor 41, and oxygen supply pipes 43 and 44 (i.e., reactor-side oxygen supply pipe 43 and desulfurizer-side oxygen supply pipe 44) extending from this air holder 42 to regeneration reaction gas outlet line 14 and regeneration recycle gas inlet line 15, respectively.

This oxygen supply means 40 is provided with oxygen concentration control means 50 for controlling the oxygen concentration in the regenerating gas (i.e., regeneration recycle gas D in this case) supplied to the inlet of desulfurizer 1 so as to adjust it to an oxygen concentration target value (e.g., about 1.5 to 2%) which keeps the internal temperature of desulfurizer 1 in course of the regeneration reaction (which will be described later) below the allowable temperature limit of adsorbent 2. In the illustrated embodiment, this oxygen concentration control means 50 comprises reactor-side oxygen feed rate control means 50a and desulfurizer-side oxygen feed rate control means 50b.

Reactor-side oxygen feed rate control means 50a comprises a flow sensor 51 for detecting the flow rate of air flowing through reactor-side oxygen supply pipe 43, a flow control valve 52 for regulating the flow rate of air flowing through reactor-side oxygen supply pipe 43, and a reactor-side oxygen feed rate controller 53 for regulating the opening of flow control valve 52 in response to a detection signal from flow sensor 51 and an output signal X2 from a reactor-side oxygen concentration controller 83 (shown in FIG. 2) which will be described later. Reactor-side oxygen feed rate controller 53 regulates the opening of the aforesaid flow control valve 52 so as to achieve an air feed rate dictated by output signal X2 from reactor-side oxygen concentration controller 83.

Reactor-side oxygen concentration controller 83 calculates the amount of oxygen (or oxygen concentration) required to oxidize sulfurous acid completely in reactor 60 on the basis of a detection signal (i.e., the sulfurous acid concentration) from a reactor-side gas sensor 82 (shown in FIG. 2) and, during steady-state operation, adjusts the opening of the aforesaid flow control valve 52 to a value corresponding to an oxygen feed rate equal to or greater than the calculated value through the medium of reactor-side oxygen feed rate controller 53.

Specifically, when the oxygen concentration required for the oxidation reaction (which will be described later) in reactor 60 is calculated to be, for example, 0.2%, the control target value is determined by adding an amount of oxygen (e.g., about 2%) somewhat smaller than the amount of oxygen (e.g., 2%) used in the regeneration step which will be described later. Then, the opening of flow control valve 52 is regulated according to the deviation of the oxygen concentration detected by the aforesaid reactor-side gas sensor 82 from the target value, in such a direction as to cause the detected value of reactor-side gas sensor 82 to agree with this target value.

On the other hand, desulfurizer-side oxygen feed rate control means 50b comprises a desulfurizer-side gas sensor 54 for detecting the oxygen concentration in regeneration recycle gas D flowing through regeneration recycle gas inlet line 15 on the inlet side of desulfurizer 1, a flow control valve 55 for regulating the flow rate of air flowing through desulfurizer-side oxygen supply pipe 44, a desulfurizer-side oxygen feed rate controller 56 for regulating the opening of flow control valve 55 in response to a detection signal from a desulfurizer-side gas sensor 54, and a regenerator temperature controller 58 for sending a signal for determining the oxygen concentration target value to desulfurizer-side oxygen feed rate controller 56 on the basis of the detected value of a temperature sensor 57 for detecting the temperature of the gas within desulfurizer 1.

The aforesaid temperature sensor 57 is installed within each desulfurizer 1 on the regeneration reaction gas outlet side thereof, and the output of temperature sensor 57 associated with desulfurizer 1 in course of the regeneration reaction is suitably switched for use as processing input to regenerator temperature controller 58. Although this temperature sensor 57 detects the temperature of the gas within desulfurizer 1 on the regeneration reaction gas outlet side thereof, this poses no problem because the temperature of adsorbent 2 can be predicted from the temperature of the gas. Of course, temperature sensor 57 may be designed so as to detect the temperature of adsorbent 2 directly.

Desulfurizer-side oxygen feed rate controller 56 regulates the opening of the aforesaid flow control valve 55 according to the deviation of the oxygen concentration detected by desulfurizer-side gas sensor 54 from the oxygen concentration target value (e.g., 2%) sent from regenerator temperature controller 58, in such a direction as to cause the detected value of desulfurizer-side gas sensor 54 to agree with this oxygen concentration target value.

Regenerator temperature controller 58 determines the oxygen concentration target value so that the temperature detected, for example, by temperature sensor 57 will be kept below a predetermined allowable temperature limit (e.g., 650 to 700° C.), and sends it to desulfurizer-side oxygen feed rate controller 56. Specifically, the oxygen concentration target value is maintained at a predetermined constant value (e.g., 2%), for example, during start-up and steady-state operation. When the detected temperature approaches the allowable temperature limit, the oxygen concentration target value is changed to a value less than the constant value according to the degree of approach.

In the case of adsorbent 2 described in connection with this embodiment, a specific example of the predetermined oxygen concentration target value is typically about 2%. However, this target value may be suitably changed according to operating conditions (such as the flow rate of regeneration recycle gas D) and the allowable temperature limit of the adsorbent.

Instead of determining the oxygen concentration target value of desulfurizer-side oxygen feed rate controller 56 as described in connection with this embodiment, regenerator temperature controller 58 may be designed so that, when the temperature detected by temperature sensor 57 approaches a predetermined temperature limit, the opening of flow control valve 55 is reduced to keep the temperature of adsorbent 2 below the allowable temperature limit, regardless of the control by desulfurizer-side oxygen feed rate controller 56. In this case, desulfurizer-side oxygen feed rate controller 56 may be designed so as to regulate the opening of flow control valve 55, for example, on the basis of a predetermined constant oxygen concentration target value (e.g., 2%).

In the construction of this embodiment, when the oxygen concentration in regeneration recycle gas D discharged from reactor 60 exceeds the aforesaid oxygen concentration target value, the oxygen concentration in regeneration recycle gas D introduced into desulfurizer 1 cannot be adjusted to the predetermined oxygen concentration target value, even by closing flow control valve 55 fully. Accordingly, the oxygen concentration target value of the aforesaid reactor-side oxygen feed rate controller 53 needs to be determined so that the oxygen concentration in regeneration recycle gas D discharged from reactor 60 will not exceed the oxygen concentration target value.

However, this need can be eliminated by providing a line for supplying an inert gas (such as nitrogen) to regeneration recycle gas inlet line 15, as well as a flow control valve. In this case, when the oxygen concentration in regeneration recycle gas D is excessively high, the inert gas may be introduced by opening the aforesaid flow control valve, for example, to a degree corresponding to the proportional sensitivity, under the control of desulfurizer-side oxygen feed rate controller 56 or the like.

Next, the construction of the gypsum recovery section is explained. As illustrated in FIG. 2, the gypsum recovery section of this system comprises a reactor 60 to which a calcium compound-containing slurry (i.e., a limestone slurry in this case) is supplied, and a rotating-arm air sparger 65 which is supported in this reactor 60 so as to be horizontally rotatable, and serves to stir the slurry within reactor 60 and to blow the supplied regeneration reaction gas C (to which air has been added through reactor-side oxygen supply pipe 43) efficiently into the slurry in the form of fine bubbles.

Reactor 60 is an elongated pressure vessel which is equipped with reactor slurry temperature control means 70 for directly controlling the temperature of the slurry placed therein. In this case, this reactor slurry temperature control means 70 comprises a heat transfer tube 71 disposed in the lower part of reactor 60, a cooling water supply line 72 for passing cooling water E through heat transfer tube 71, a flow control valve 73 for regulating the flow rate of cooling water flowing through cooling water supply line 72, a steam supply line 74 for adding steam F to the gas C blown into reactor 60, a flow control valve 75 for regulating the flow rate of steam flowing through steam supply line 74, a temperature sensor 76 for detecting the temperature of the slurry within reactor 60, and a temperature controller 77 for regulating the opening of flow control valve 73 of cooling water supply line 72 or flow control valve 75 of steam supply line 74 in response to an output signal from temperature sensor 76.

Temperature controller 77 is an electric circuit having the function of controlling flow control valve 73 or 75 according to the deviation of the output value of temperature sensor 76 from a target value in such a direction as to cause the output value of temperature sensor 76 to agree with the target value. This control target value can be preset so as to fall within a temperature range (i.e., 120° C. or below and preferably 90° C. or below) which causes gypsum dihydrate to precipitate.

That is, this temperature controller 77 sends a control signal to an actuator for driving flow control valve 73 or 75, and thereby regulates the opening of flow control valve 73 or 75. For example, when its control target value is preset at 90° C., temperature controller 77 functions to change the value of the control signal in such a way that, if the output value of temperature sensor 76 rises above 90° C., the opening of flow control valve 73 is increased according to the degree of rise, while if the output value of temperature sensor 76 falls below 90° C., the opening of flow control valve 73 is decreased according to the degree of fall. Moreover, if the output value of temperature sensor 76 is extremely low, for example, during start-up, temperature controller 77 functions to open flow control valve 75 according to the degree of fall.

In this case, the temperature control means of the present invention comprises reactor slurry temperature control means 70, together with regeneration reaction gas temperature control means 84 and absorbent slurry temperature control means 120 which will be described later.

To rotating-arm air sparger 65, the regeneration reaction gas C (to which air has been added) is supplied through a regeneration reaction gas inlet line 81 connected with the aforesaid regeneration reaction gas outlet line 14. This regeneration reaction gas inlet line 81 is provided with a reactor-side gas sensor 82 for detecting the sulfur dioxide and oxygen concentrations of the gas flow through this line. In response to an output signal X2 from a reactor-side oxygen concentration controller 83 which receives a detection signal from this reactor-side gas sensor 82, the opening of flow control valve 52 (i.e., the reactor-side oxygen feed rate) is regulated as described above.

Moreover, regeneration reaction gas inlet line 81 is also provided with regeneration reaction gas temperature control means 84 for previously cooling the gas blown into the slurry within reactor 60 through this line.

Regeneration reaction gas temperature control means 84 comprises a cooling water line 85 for supplying cooling water G, a heat exchanger 86 for effecting heat exchange between regeneration reaction gas C and cooling water G flowing through cooling water line 85, flow control valve 87 for regulating the flow rate of cooling water G flowing through cooling water line 85, a temperature sensor 88 installed in regeneration reaction gas inlet line 81 for detecting the temperature of the gas flowing through regeneration reaction gas inlet line 81, and a temperature controller 89 for regulating the opening of flow control valve 87 in response to a detection signal from temperature sensor 88.

In order to lessen the burden of the aforesaid reactor slurry temperature control means 70, temperature controller 89 permits the temperature of the blown gas to be previously adjusted to a value close to the control target value (e.g., 90° C.) for the temperature of the slurry within reactor 60. Its control target value is preset, for example, at about 100° C. Specifically, temperature controller 89 functions in such a way that, if the output value of temperature sensor 88 rises above (for example) 100° C., the opening of flow control valve 87 is increased according to the degree of rise, while if the output value of temperature sensor 88 falls below 100° C., the opening of flow control valve 87 is decreased according to the degree of fall.

A regeneration recycle gas outlet line 90 is connected with the upper part of reactor 60, so that the gas produced by blowing regeneration reaction gas C (to which air has been added) into reactor 60 and removing sulfur dioxide therefrom by contact with the slurry (i.e., regeneration recycle gas D) can be supplied to the heat exchanger 32 of regeneration recycle gas inlet line 15 shown in FIG. 1, through this regeneration recycle gas outlet line 90.

This regeneration recycle gas outlet line 90 may be provided with a mist eliminator so that mist present in the gas discharged from reactor 60 (i.e., mist formed from the slurry within reactor 60) will be separated and returned to reactor 60.

Reactor 60 is provided with a pressure sensor 91 for detecting the internal pressure thereof. Under the control of a pressure controller 92 on the basis of the output value of this pressure sensor 91, the opening of the aforesaid flow control valve 36 (shown in FIG. 1) is regulated so that the internal pressure of reactor 60 will be adjusted to a predetermined value.

Moreover, a slurry withdrawal line 100 is connected with the lower part of reactor 60, so that the slurry within reactor 60 can be withdrawn into a solid-liquid separator 101. This slurry withdrawal line 100 is provided with a flow control valve 102. Under the control of a level controller 103 for detecting the liquid level within reactor 60, the opening of flow control valve 102 is regulated so that the liquid level within reactor 60 will be kept within a predetermined range.

In solid-liquid separator 101, the slurry introduced thereinto is subjected to solid-liquid separation. Thus, its solid component (i.e., gypsum H) is collected, while the filtrate is transferred to a filtrate pit 105 through a filtrate recovery line 104. To filtrate pit 105 is supplied make-up water I through a make-up water supply line 106. Moreover, filtrate pit 105 is equipped with a stirrer 107 and a liquid level sensor 108. Under the control of a level controller 109 reading the output of this liquid level sensor 108, the opening of a flow control valve 110 installed in make-up water supply line 106 is regulated so that the liquid level within filtrate pit 105 will be kept within a predetermined range.

As solid-liquid separator 101, there may be used, for example, a vacuum belt filter or a continuous centrifugal separator.

The liquid (consisting essentially of water) within filtrate pit 105 is supplied to a limestone slurry pit 113 through a liquid supply line 112 by means of a pump 111. This liquid supply line 112 is provided with a flow sensor 114 and a flow control valve 115, so that the feed rate of the liquid is controlled on the basis of the detected value of a level sensor (not shown) for detecting the liquid level within limestone slurry pit 113. Specifically, the opening of flow control valve 115 is regulated by a flow controller 116 so that the liquid level within limestone slurry pit 113 will be kept within a predetermined range. In this case, a signal representing the feed rate of the liquid is successively sent from flow controller 116 to a limestone addition controller 132 which will be described later, so that limestone is added to limestone slurry pit 113 in a weight corresponding to the feed rate of the liquid.

Moreover, limestone slurry pit 113 is equipped with a stirrer 117 and absorbent slurry temperature control means 120 for previously cooling the limestone slurry within limestone slurry pit 113.

Absorbent slurry temperature control means 120 comprises a heat transfer tube 121 disposed in the slurry within limestone slurry pit 113, a cooling water supply line 122 for passing cooling water J through heat transfer tube 121, a flow control valve 123 for regulating the flow rate of cooling water J flowing through cooling water supply line 122, a temperature sensor 124 disposed in the slurry within limestone slurry pit 113 for detecting the temperature of the slurry, and a temperature controller 125 for regulating the opening of flow control valve 123 in response to a detection signal from temperature sensor 124.

In order to lessen the burden of the aforesaid reactor slurry temperature control means 70, temperature controller 125 permits the temperature of the limestone slurry fed to reactor 60 to be previously adjusted to a value close to the control target value (e.g., 90° C.) for the temperature of the slurry within reactor 60. Its control target value is preset, for example, at about 70° C. Specifically, temperature controller 125 functions in such a way that, if the output value of temperature sensor 124 rises above (for example) 70° C., the opening of flow control valve 123 is increased according to the degree of rise, while if the output value of temperature sensor 124 falls below 70° C., the opening of flow control valve 123 is decreased according to the degree of fall.

To limestone slurry pit 113, powdered limestone (CaCO₃) K is suitably supplied from a silo 130 in an amount corresponding to the feed rate of the liquid supplied through the aforesaid liquid supply line 112. Specifically, an on-off valve 131 for opening or closing the outlet for limestone is provided at the bottom of silo 130. The operation of this on-off valve 131 is controlled by limestone addition controller 132. In response to a signal sent from the aforesaid flow controller 116 and representing the feed rate of the liquid, limestone addition controller 132 actuates on-off valve 131 so that limestone K is added to limestone slurry pit 113 in an amount corresponding to the feed rate of the liquid. In this case, limestone K discharged through on-off valve 131 is carried by a conveyor 133 and added to limestone slurry pit 113.

The limestone slurry within limestone slurry pit 113 is fed to reactor 60 through a slurry feed line 142 by means of a pump 141. This pump 141 comprises, for example, a plunger pump and serves to pressurize the limestone slurry and thereby introduce it into reactor 60 under pressure.

This slurry feed line 142 is provided with a flow control valve 143. Under the control of a pH controller 145 on the basis of the output value of a pH sensor 144, the opening of flow control valve 143 is regulated so that the feed rate of the limestone slurry will be adjusted to a predetermined value. In this case, pH sensor 144 is installed in a bypass 146 connecting the aforesaid slurry withdrawal line 100 with filtrate recovery line 104 and serves to detect the pH value of the slurry flowing through this bypass line 146 (i.e., the pH value of the slurry within reactor 60). Then, pH controller 145 regulates the opening of flow control valve 143 in response to the output value of pH sensor 144. Thus, the feed rate of the limestone slurry is controlled so that the pH value of the slurry within reactor 60 will be maintained at the optimum value (e.g., pH 5–6) which allows the absorption and oxidation reactions within reactor 60 (as will be described later) to proceed efficiently.

Next, the gas refining and gypsum recovery operations carried out in the gas refining system constructed in the above-described manner are explained.

In an electric power generating system or the like, the gas produced in a gasification furnace (not shown) typically has a temperature of 1,000 to 2,000° C. immediately after leaving the outlet of the furnace. By undergoing heat recovery with a steam heater (not shown) which is usually installed on the outlet side of the furnace, this gas is cooled to a temperature of about 250 to 500° C. and then dedusted with a dust separator (not shown). Thereafter, this gas is fed to the gas refining section of FIG. 1 as reducing gas A.

This reducing gas A consists essentially of hydrogen ($H_2$) and carbon monoxide (CO), and usually contains sulfur compound (or compounds) such as hydrogen sulfide ($H_2S$) and/or carbonyl sulfide (COS) at a concentration of several tens to several thousands of parts per million. Its pressure is as high as about 25 to 30 kg/cm².

For example, in the case of a 270 MW electric power plant based on the gasification of coal, the flow rate of reducing gas A is about 310,000 Nm³/h.

A large portion of reducing gas A fed to the gas refining section is conducted through first gas inlet line 11 and valve 21 and introduced into desulfurizer 1 operating in the mode of the absorption step (i.e., the left-hand desulfurizer 1 in FIG. 1), where it is effectively contacted with a honeycomb adsorbent (e.g., $Fe_3O_4$). Thus, hydrogen sulfide ($H_2S$) and carbonyl sulfide (COS) are absorbed and removed as iron sulfide, for example, by the absorption reactions represented by the following equations (1) and (2). Thereafter, the resulting gas is discharged as refined gas B through valve 24 and refined gas outlet line 13, and fed to downstream equipment (e.g., a gas turbine) in the electric power generating system or the like.

$$3H_2S + Fe_3O_4 + H_2 \rightarrow 3FeS + 4H_2O \qquad (1)$$

$$3COS + Fe_3O_4 + CO \rightarrow 3FeS + 4CO_2 \qquad (2)$$

On the other hand, some of reducing gas A fed to the gas refining section is conducted through second gas inlet line 12 and valve 22 and introduced into desulfurizer 1 operating in the mode of the reduction step (i.e., the middle desulfurizer 1 in FIG. 1), where it is effectively contacted with the regenerated adsorbent (e.g., $Fe_2O_3$). Thus, the adsorbent is converted into a form having absorbing power (e.g., $Fe_3O_4$), for example, by the reduction reactions represented by the following equations (3) and (4).

After leaving desulfurizer 1 operating in the mode of the reduction step, this portion of reducing gas A, which contains sulfur compound (or compounds), is conducted through valve 24 and introduced into refined gas outlet line 13 where it is mixed with refined gas B. However, this poses no problem because its amount is small. For example, in the case of a 270 MW electric power plant based on the gasification of coal, the flow rate of reducing gas A used for this reduction step may theoretically be as low as about 390 $Nm^3/h$.

Alternatively, this portion of reducing gas A may be introduced, for example, into the middle part or inlet of desulfurizer 1 operating in the mode of the absorption step, where hydrogen sulfide ($H_2S$) and carbonyl sulfide (COS) are absorbed and removed by the above-described absorption reactions. The resulting gas may be discharged as refined gas B through valve 24 and refined gas outlet line 13.

$$3Fe_2O_3+H_2 \rightarrow 2Fe_3O_4+H_2O \quad (3)$$

$$3Fe_2O_3+CO \rightarrow 2Fe_3O_4+CO_2 \quad (4)$$

In the remaining desulfurizer 1 (i.e., the right-hand desulfurizer 1 in FIG. 1), the regeneration step of roasting the adsorbent having been converted into iron sulfide is carried out at the same time as the above-described absorption and reduction steps. That is, regeneration recycle gas D is conducted through regeneration recycle gas inlet line 15 and valve 25 and introduced into the remaining desulfurizer 1, where the adsorbent is reacted with oxygen present in regeneration recycle gas D and regenerated by the regeneration (or roasting) reaction represented by the following equation (5).

$$4FeS+7O_2 \rightarrow 2Fe_2O_3+4SO_2 \quad (5)$$

During this process, under the control of the aforesaid oxygen concentration control means 50 (comprising reactor-side oxygen feed rate control means 50a and desulfurizer-side oxygen feed rate control means 50b), the oxygen concentration in regeneration recycle gas D supplied to the inlet of desulfurizer 1 is adjusted to an oxygen concentration target value which permits the temperature of adsorbent 2 within desulfurizer 1 in course of the regeneration reaction to be kept within an allowable temperature range. Specifically, when $Fe_2O_3$ is used as the adsorbent, the temperature of the adsorbent can be kept below, but close to, a temperature limit of about 600 to 700° C., for example, by adjusting the oxygen concentration to 2% or less. Thus, deterioration and powdering of the adsorbent can be prevented positively and easily. Moreover, the temperature of the adsorbent is maintained on a high level in the vicinity of its limit and the regeneration (or roasting) reaction is kept highly active, so that the time required for this regeneration reaction becomes shortest.

It is known that the temperature (i.e., heat of reaction) of adsorbent 2 in the aforesaid regeneration reaction depends on the feed rate of oxygen and can hence be controlled with good responsiveness by regulating the oxygen concentration in the supplied regeneration recycle gas D. Accordingly, the above-described temperature control of the adsorbent can be achieved reliably.

Also during this process, under the flow rate control of the aforesaid flow rate controller 37, the flow rate of regeneration recycle gas D supplied to the inlet of desulfurizer 1 is adjusted to about 35,000 $Nm^3/h$, for example, in the case of a 270 MW electric power plant based on the gasification of coal. Moreover, by means of heat exchangers 31 and 32, the temperature of regeneration recycle gas D supplied to the inlet of desulfurizer 1 is raised to a temperature (e.g., about 400° C.) which permits the aforesaid regeneration (or roasting) reaction to be induced and sustained satisfactorily.

Regeneration reaction gas C produced in this regeneration step, which contains a high concentration (e.g., about 0.5 to 10%) of sulfur dioxide ($SO_2$), is fed to the gypsum recovery section of FIG. 2 through valve 23 and regenerated gas outlet line 14.

This regeneration reaction gas C consists mainly (e.g., about 85 to 95%) of nitrogen ($N_2$) and contains very small amounts of carbon dioxide and water in addition to sulfur dioxide ($SO_2$). Its pressure is usually in the range of, for example, about 10 to 25 kg/cm and its temperature at the inlet of desulfurizer 1 is, for example, of the order of 600° C. Even after being cooled by heat exchanger 31 and 32, regeneration reaction gas C is fed to the gypsum recovery section as a high-temperature and high-pressure gas having a temperature of about 200 to 400° C.

To regeneration reaction gas C fed to the gypsum recovery section, air (or an oxygen-containing gas) is supplied through the reactor-side oxygen supply pipe 43 of oxygen supply means 40. Owing to the function of the aforesaid reactor-side oxygen feed rate control means 50a, the oxygen concentration in regeneration reaction gas C is adjusted to a value (e.g., about 2%) greater than the concentration corresponding to the amount of oxygen required for the oxidation reactions (which will be described later) within reactor 60.

Regeneration reaction gas C fed to the gypsum recovery section is conducted through heat exchanger 86 and regeneration reaction gas inlet line 81 with its temperature being adjusted, for example, to about 100° C. under the control of the aforesaid temperature controller 89. Then, by means of rotating-arm air sparger 65, regeneration reaction gas C is blown into the slurry within reactor 60 in the form of fine bubbles.

Consequently, most of the sulfur dioxide contained in the blown regeneration reaction gas C is absorbed into the slurry within reactor 60. Finally, the clean gas from which sulfur dioxide has been removed, together with unreacted air, is discharged through regeneration recycle gas outlet line 90 and supplied as regeneration recycle gas D to desulfurizer 1 in course of the regeneration reaction.

On the other hand, the slurry having absorbed sulfur dioxide present in regeneration reaction gas C is brought into contact with oxygen present in the air blown thereinto, so that the sulfur dioxide is oxidized and then undergoes a neutralization reaction to form gypsum.

During this process, by utilizing the high pressure of regeneration reaction gas C, the pressure within reactor 60 is maintained at a high level, for example, of the order of 5 to 25 $kg/cm^2$ under the control of the aforesaid pressure controller 92. Thus, the aforesaid absorption and oxidation reactions can be efficiently carried out in a small gas volume.

Owing to the high temperature of regeneration reaction gas C and the evolution of heat by the above-described absorption and oxidation reactions, the temperature of the slurry within reactor 60 will become very high unless it is properly controlled. Accordingly, temperature control (or cooling) is effected by the aforesaid reactor slurry temperature control means 70, so that the temperature of the slurry within reactor 60 is continuously adjusted to a value (e.g., about 90° C.) at which gypsum dihydrate precipitates easily.

The predominant reactions which occur within reactor 60 are those represented by the following equations (6) to (8), and the form of gypsum which precipitates during the aforesaid neutralization reaction is gypsum dihydrate.

$$SO_2 + H_2O \rightarrow H^+ + HSO_3^- \qquad (6)$$

$$H + HSO_3^- 1/2O_2 \rightarrow 2H^+ + SO_4^{2-} \qquad (7)$$

$$2H^+ + SO_4^{2-} + CaCO_3 + H_2O \rightarrow CaSO_4 \cdot 2H_2O + CO_2 \qquad (8)$$

During this process, owing to the function of the aforesaid reactor-side oxygen feed rate control means 50a, the oxygen concentration in regeneration reaction gas C is adjusted to a value (e.g., about 2%) greater than the concentration corresponding to the amount of oxygen required for the aforesaid oxidation reactions within reactor 60. Consequently, the partial pressure of oxygen within reactor 60 is maintained at a value significantly greater than the minimum partial pressure of oxygen required to completely oxidize sulfurous acid by the aforesaid oxidations. As a result, the aforesaid oxidation reactions are sufficiently accelerated to achieve the efficient precipitation of gypsum dihydrate and maintain high absorption performance for sulfur dioxide.

Thus, regeneration recycle gas D discharged through regeneration recycle gas outlet line 90 contains essentially no sulfur dioxide and has oxygen at the concentration required for the regeneration reaction (e.g., about 1.5%). Then, regeneration recycle gas C is returned to desulfurizer 1 in course of the regeneration reaction.

In this case, the temperature of regeneration recycle gas D immediately after leaving reactor 60 is about 80° C., and its flow rate is, for example, about 38,000 Nm³/h. Subsequently, the temperature of this regeneration recycle gas D is raised by means of heat exchangers 31 and 32, and adjusted to the aforesaid temperature (i.e., about 400° C.) by the time when it is introduced into the desulfurizer operating in the mode of the regeneration step.

Moreover, the oxygen concentration of this regeneration recycle gas D is further subjected to fine control by the aforesaid desulfurizer-side oxygen feed rate control means 50b and finally and positively adjusted to the aforesaid control target value (e.g., 2% or less) by the time when it is introduced into the desulfurizer operating in the mode of the regeneration step.

As a result of the reactions represented by the above equations (6) to (8), gypsum and a minor amount of limestone (CaCO₃) used as absorbent are steadily suspended in the slurry within reactor 60. This slurry is withdrawn through slurry withdrawal line 100 and transferred to solid-liquid separator 101 where it is subjected to solid-liquid separation therein. Thus, its solid component (i.e., gypsum H) is collected, while the filtrate is transferred to filtrate pit 105 and then recycled to limestone slurry pit 113 by means of pump 111.

A limestone slurry is fed through limestone slurry feed line 142 to reactor 60 by means of pump 141, and its feed rate is controlled in the above-described manner by pH controller 145 and flow control valve 143.

During this process, under the control of the aforesaid temperature controller 125, the temperature of the slurry fed to reactor 60 is previously adjusted to a value (e.g., about 70° C.) close to the control target value (e.g., 90° C.) for the temperature of the slurry within the reactor.

The gas refining system in accordance with the above-described embodiment has various actions and effects as described above.

(1) The temperature of adsorbent 2 within desulfurizer 1 operating in the mode of the regeneration step is surely kept within the allowable temperature range of adsorbent 2 by controlling the oxygen concentration in the regenerating gas (or regeneration recycle gas D) by oxygen concentration control means 50. Thus, deterioration or powdering of adsorbent 2 can be prevented positively and easily.

(2) Moreover, as a result of the aforesaid oxygen concentration control, the internal temperature of desulfurizer 1 in course of the regeneration reaction is kept close to the allowable temperature limit of adsorbent 2 and, therefore, the temperature of adsorbent 2 is maintained at the highest possible level. Thus, it is possible to accelerate the regeneration (or roasting) reaction while preventing deterioration or the like of adsorbent 2, and thereby complete the regeneration step in the shortest period of time.

(3) Owing to the action of the gypsum recovery section, gypsum which may be sold on the market can be obtained from sulfur compounds absorbed in the gas refining section.

Especially in this embodiment, owing to the function of the aforesaid temperature controller 77 and the like, the temperature of the slurry within reactor 60 is continuously controlled so as to fall within a temperature range (i.e., 120° C. or below and preferably 90° C. or below) which causes gypsum dihydrate to precipitate. Moreover, the resulting gypsum is in the form of gypsum dihydrate that has great utility and is easy to handle. Gypsum dihydrate has sufficient characteristics for use, for example, as a raw material for the manufacture of building materials having a large-scale market, and can be stored outdoors and handled easily as contrasted with α-gypsum hemihydrate.

In this connection, since the supply of water of crystallization to α-gypsum hemihydrate (CaSO₄·1/2H₂O) converts it to gypsum dihydrate, α-gypsum hemihydrate is sensitive moisture, cannot be stored outdoors, and must be stored and conveyed with consideration for protection from moisture. Thus, its handling is very troublesome. Moreover, in addition to the problem of protection from moisture which makes it difficult to store α-gypsum hemihydrate for a long period of time, the market (or demand) therefor is rather limited. According to the conditions of the market, therefore, it may be difficult to recover a high profit. Especially when the above-described gas refining process has come to be employed on a full scale in such facilities as electric power plants, there is a possibility that its supply will become excessive and its commercial value will decline steadily.

Accordingly, the gas refining system in accordance with this embodiment is advantageous in that gypsum dihydrate which has great utility and is easy to handle can be obtained.

(4) The gas produced above the surface of the slurry within reactor 60 (i.e., regeneration reaction gas C which has been blown into the slurry and freed of sulfur dioxide by absorption into the slurry while ascending therethrough) is discharged as regeneration recycle gas D and recycled for use as the regenerating gas in the regeneration (or roasting) reaction of adsorbent 2 within desulfurizer 1 in course of the regeneration reaction. This is effective in reducing the amount of air (or nitrogen) used as an inert gas.

(5) Owing to the function of reactor-side oxygen feed rate control means 50a, oxygen concentration control means 50 adjusts the oxygen concentration in regeneration reaction gas C blown into the slurry within reactor 60 to a value in excess of the minimum value required for the oxidation reactions within reactor 60. Subsequently, the oxygen concentration in regeneration recycle gas D obtained after the reaction of regeneration reaction gas C within reactor 60 is subjected to finer control by reactor-side oxygen feed rate control means 50b and finally adjusted to a predetermined oxygen concentration (e.g., 2% or less) so as to control the temperature of the adsorbent. Consequently, the partial pressure of oxygen within reactor 60 is maintained at a value significantly greater than the minimum partial pressure of oxygen required to completely oxidize the sulfurous acid absorbed into the slurry. As a result, the oxidation reactions occurring in the reactor 60 are sufficiently accelerated to achieve the efficient precipitation of gypsum dihydrate and maintain high absorption performance for sulfur dioxide.

(6) The temperature control of the slurry within reactor 60 for the formation of gypsum dihydrate is finally exercised by reactor slurry temperature control means 70. However, owing to the function of the aforesaid regeneration reaction gas temperature control means 84 or absorbent slurry temperature control means 120, the temperature of regeneration reaction gas C blown into reactor 60 or the temperature of the limestone slurry fed to reactor 60 is previously adjusted to a value (e.g., about 100° C. or 70° C.) close to the control target value (e.g., 90° C.). This not only lessens the burden of reactor slurry temperature control means 70 and thereby enables the temperature of the slurry within reactor 60 to be controlled easily and precisely, but also simplifies the construction of and reduces the size of the cooling means (i.e., heat transfer tube 71 and the like) constituting reactor slurry temperature control means 70.

It is to be understood that the present invention is not limited to the above-described embodiment but may be practice in various ways.

For example, instead of comprising both reactor-side oxygen feed rate control means 50a and desulfurizer-side oxygen feed rate control means 50b as shown in the above-described embodiment, the oxygen concentration control means of the present invention may comprise reactor-side oxygen feed rate control means alone.

Figure 3:
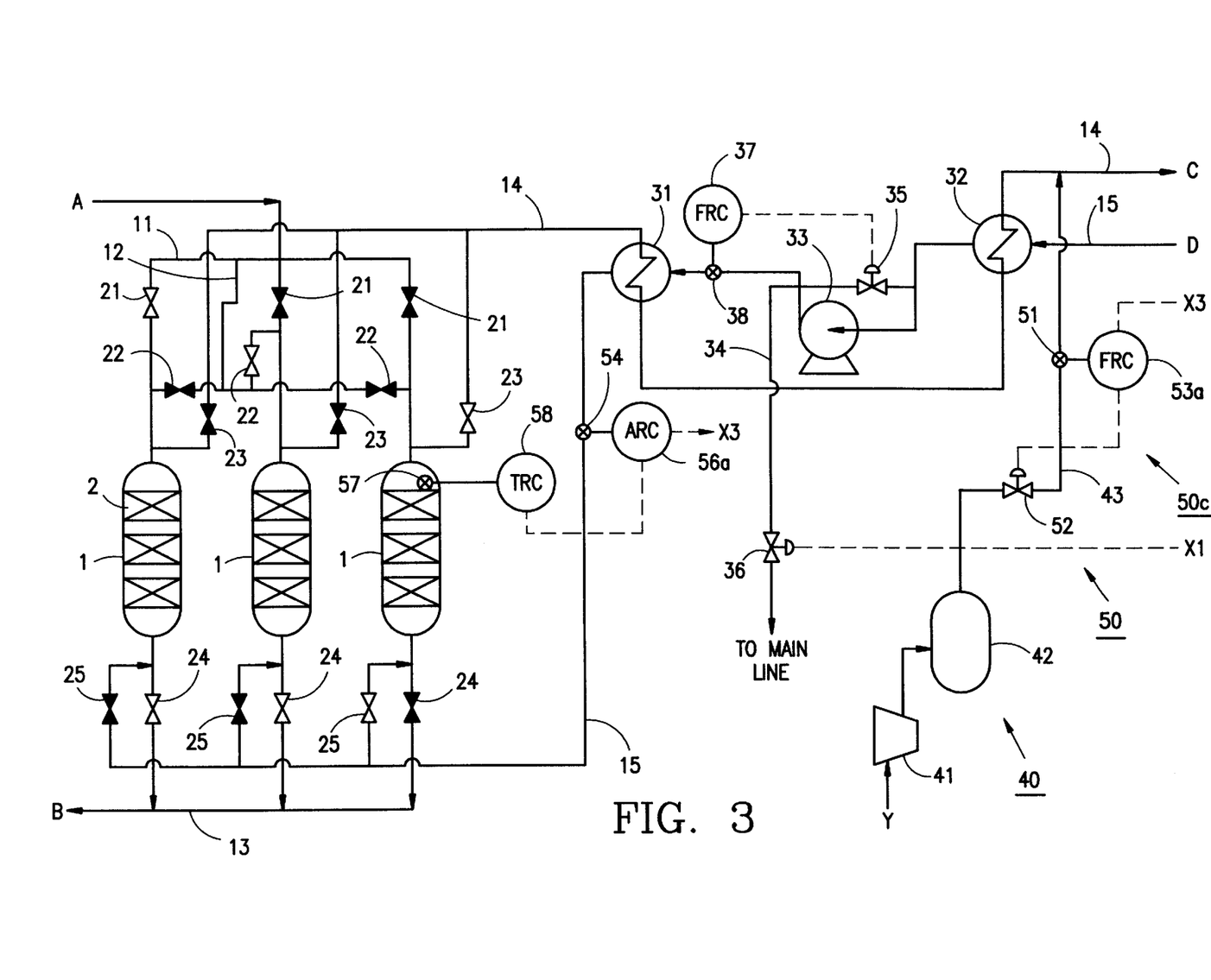
FIG. 3 is a flow diagram showing chiefly the construction of the gas refining section of a gas refining system in accordance with another embodiment of the present invention.

For example, as shown in FIG. 3, the oxygen concentration control means of the present invention may comprise reactor-side oxygen feed rate control means 50c alone. This reactor-side oxygen feed rate control means 50c comprises a flow sensor 51 for detecting the flow rate of air flowing through reactor-side oxygen supply pipe 43, a flow control valve 52 for regulating the flow rate of air flowing through reactor-side oxygen supply pipe 43, and a reactor-side oxygen feed rate controller 53a for regulating the opening of flow control valve 52 in response to a detection signal from flow sensor 51 and an output signal X3 from a reactor-side oxygen concentration controller 56a.

In this case, reactor-side oxygen concentration controller 56a produces a feed rate control target value for reactor-side oxygen feed rate controller 53a as output signal X3. According to the deviation of the oxygen concentration detected by desulfurizer-side gas sensor 54 from the oxygen concentration target value (e.g., 2%) sent from regenerator temperature controller 58, the aforesaid feed rate control target value is varied in such a direction as to cause the detected value of desulfurizer-side gas sensor 54 to agree with this oxygen concentration target value. Thus, the oxygen concentration in the regeneration recycle gas introduced into desulfurizer 1 in course of the regeneration reaction is adjusted to a predetermined value.

In this case, the opening of flow control valve 52 may be directly regulated by reactor-side oxygen concentration controller 56a.

Also in this case, air is consequently introduced into reactor 60 in an amount greater than that corresponding to the amount of oxygen required to carry out the oxidation reactions for the recovery of gypsum. The excess oxygen is continuously maintained at the minimum amount required for the regeneration step within desulfurizer 1, so that the temperature control of adsorbent during the regeneration reaction is achieved with high reliability.

According to this embodiment, the construction of the oxygen concentration control means of the present invention is much simplified and an oxygen-containing gas can be supplied to the entire system through only one oxygen-containing gas supply line (i.e., reactor-side oxygen supply line 43 shown in FIG. 3). This is effective in simplifying the piping design and equipment construction of the system and, in turn, achieving a reduction in the size and cost of the system.

In this case, however, if the amount of oxygen consumed within reactor 60 varies greatly, feedback based on the quick and precise control of the amount of unreacted oxygen (or oxygen concentration) remaining in regeneration recycle gas D must be carried out instantaneously. Accordingly, the above-described embodiment of FIGS. 1 and 2 in which the oxygen concentration in regeneration recycle gas D introduced into desulfurizer 1 is finally subjected to finer control by desulfurizer-side oxygen feed rate control means 50b is superior in preciseness and responsiveness to variations.

Even when the oxygen concentration control means of the present invention comprises both reactor-side oxygen feed rate control means and desulfurizer-side oxygen feed rate control means as shown in the above-described embodiment, oxygen feed rate control may be effected in such a way that only the amount of oxygen required for the oxidation reaction within reactor 60 is supplied to regeneration reaction gas C by the reactor-side oxygen feed rate control means and most of the amount of oxygen required for the regeneration (or roasting) reaction within desulfurizer 1 in course of the regeneration reaction is supplied to regeneration recycle gas D by the desulfurizer-side oxygen feed rate control means. However, the above-described reaction-accelerating effect due to an excessively high partial pressure of oxygen within reactor 60 is not achieved in this case. Accordingly, the above-described first embodiment is superior in this respect.

Moreover, in the above-described first embodiment, the sulfur compounds adsorbed in the above-described manner need not necessarily be recovered in the form of gypsum, but may be recovered, for example, in the form of elemental sulfur.

Furthermore, the temperature control means of the present invention (e.g., reactor slurry temperature control means 70) need not necessarily be of a type in which a coolant is passed through a heat transfer tube disposed within the reactor or the like as shown in the above-described embodiment, but may be of a type in which a coolant is passed through a jacket (or coolant passage) formed around the reactor or the like. Alternatively, the temperature control means of the present invention may comprise, for example, reactor slurry temperature control means 70 alone without using regeneration reaction gas temperature control means 84 or absorbent slurry temperature control means 120.

Furthermore, it is also possible to use, for example, a rotary atomizer as the means for blowing the regeneration reaction gas into the reactor.

We claim:

1. A method for refining gas obtained by gasification of coal or oil comprising the steps of:

providing a reducing gas having sulfur-containing compounds;

introducing the reducing gas into a fixed-bed desulfurizer packed with an amount of adsorbent;

adsorbing the sulfur-containing compounds in the form of sulfides onto the adsorbent;

introducing an oxygen-containing regenerating gas into the desulfurizer to regenerate the adsorbent and form a regeneration reaction gas containing sulfur dioxide;

introducing the regeneration reaction gas into a reactor having a calcium compound-containing slurry;

introducing an oxygen-containing gas into the slurry;

contacting the regeneration reaction gas and the oxygen-containing gas with the slurry to absorb the sulfur dioxide and precipitate a gypsum-containing compound within the reactor;

producing a gas above the surface of the slurry within the reactor;

withdrawing the gas above the surface of the slurry and recycling the gas as the oxygen-containing regenerating gas; and controlling the temperature of the adsorbent by controlling the oxygen concentration of the regenerating gas, said step of controlling the oxygen concentration of the regenerating gas comprising controlling the flow rate of the oxygen-containing gas introduced to the slurry so as to maintain an oxygen concentration in the recycled regenerating gas that maintains the internal temperature of the desulfurizer during regeneration of the adsorbent within an allowable adsorbent temperature range.

2. The method according to claim 1, further comprising the step of:

controlling the temperature of the slurry within a temperature range sufficient to precipitate gypsum dihydrate from the slurry.

3. A method for refining gas obtained by gasification of coal or oil comprising the steps of:

providing a reducing gas having sulfur-containing compounds;

introducing the reducing gas into a fixed-bed desulfurizer packed with an amount of adsorbent;

adsorbing the sulfur-containing compounds in the form of sulfides onto the adsorbent;

introducing an oxygen-containing regenerating gas into the desulfurizer to regenerate the adsorbent and form a regeneration reaction gas containing sulfur dioxide;

introducing the regeneration reaction gas into a reactor having a calcium compound-containing slurry;

introducing a first oxygen-containing gas into the slurry;

contacting the regeneration reaction gas and the first oxygen-containing gas with the slurry to absorb the sulfur dioxide and precipitate a gypsum-containing compound within the reactor;

producing a gas above the surface of the slurry within the reactor;

withdrawing the gas above the surface of the slurry;

combining the gas withdrawn from above the surface of the slurry with a second oxygen-containing gas and recycling the combined gases as the oxygen-containing regenerating gas; and controlling the temperature of the adsorbent by controlling the oxygen concentration of the regenerating gas, said step of controlling the oxygen concentration of the regenerating gas comprising adjusting the first oxygen-containing gas to a flow rate sufficient to provide an amount of oxygen to the reactor greater than that required for complete oxidation of the absorbed sulfur-containing compounds and adjusting the flow rate of the second oxygen-containing gas so as to maintain an oxygen concentration in the recycled regenerating gas that maintains the internal temperature of the desulfurizer during regeneration of the adsorbent within an allowable adsorbent temperature range.

4. The method according to claim 3, further comprising the steps of:

controlling the temperature of the slurry within a temperature range sufficient to precipitate gypsum dihydrate from the slurry.

* * * * *

UNITED STATES PATENT AND TRADEMARK OFFICE
CERTIFICATE OF CORRECTION

PATENT NO. : 5,980,846

DATED : November 9, 1999

INVENTOR(S) : Tatani et al.

It is certified that error appears in the above-identified patent and that said Letters Patent is hereby corrected as shown below:

Title page, [56] References Cited, FOREIGN PATENT DOCUMENTS, line 2, "63-12801" should read --63-123801--.

Signed and Sealed this

First Day of August, 2000

*Attest:*

Q. TODD DICKINSON

*Attesting Officer*      *Director of Patents and Trademarks*